Sept. 4, 1956 R. E. OLWIN 2,761,703
CAM OPERATED QUICK OPERATING HOSE COUPLING
Filed March 12, 1953 2 Sheets-Sheet 2
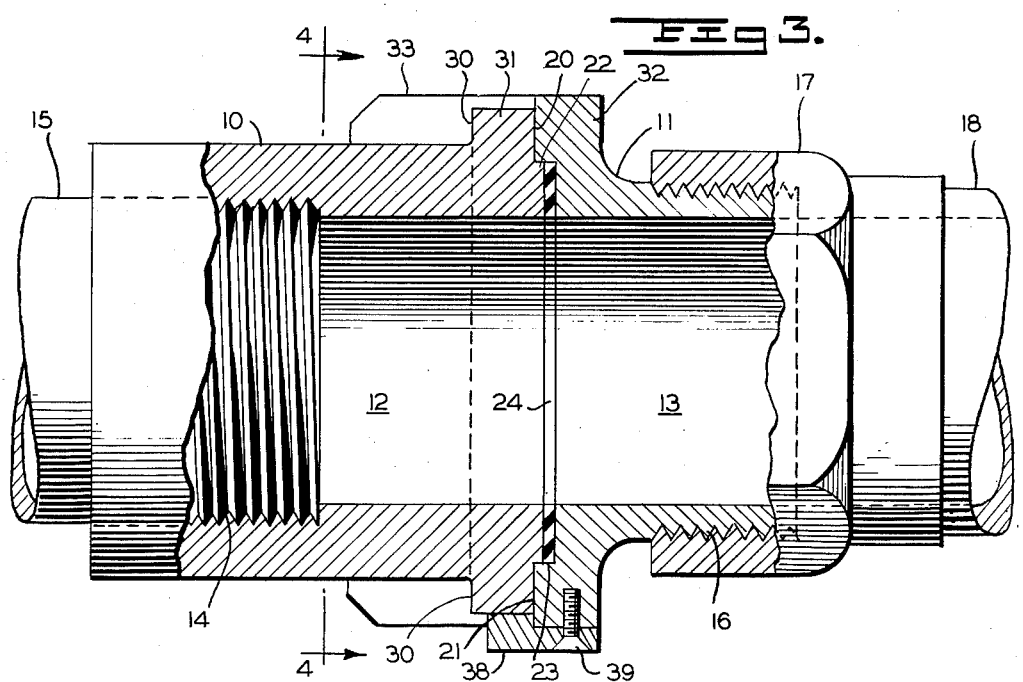
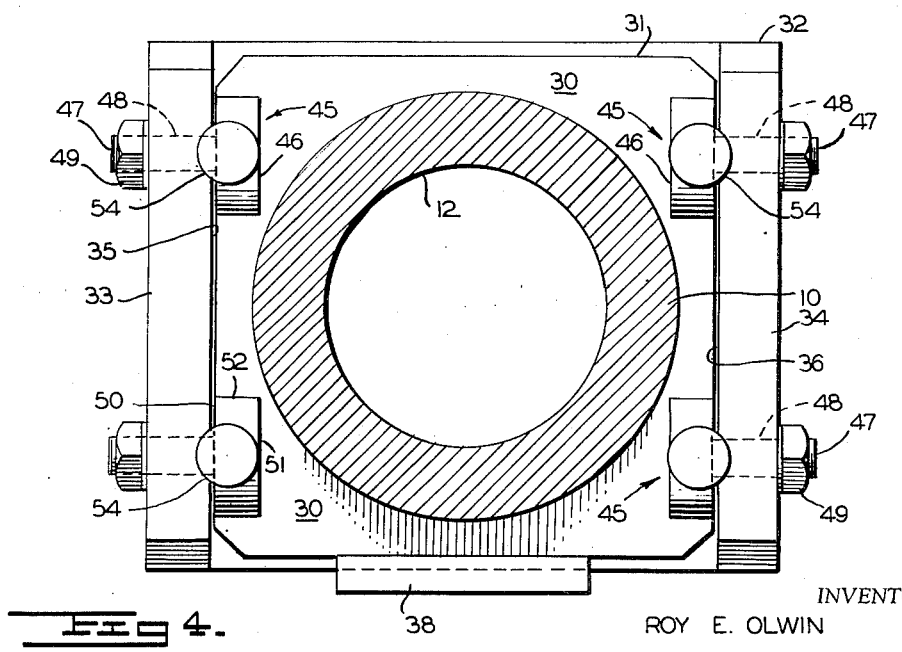
INVENTOR
ROY E. OLWIN
BY
ATTORNEY

United States Patent Office 2,761,703
Patented Sept. 4, 1956

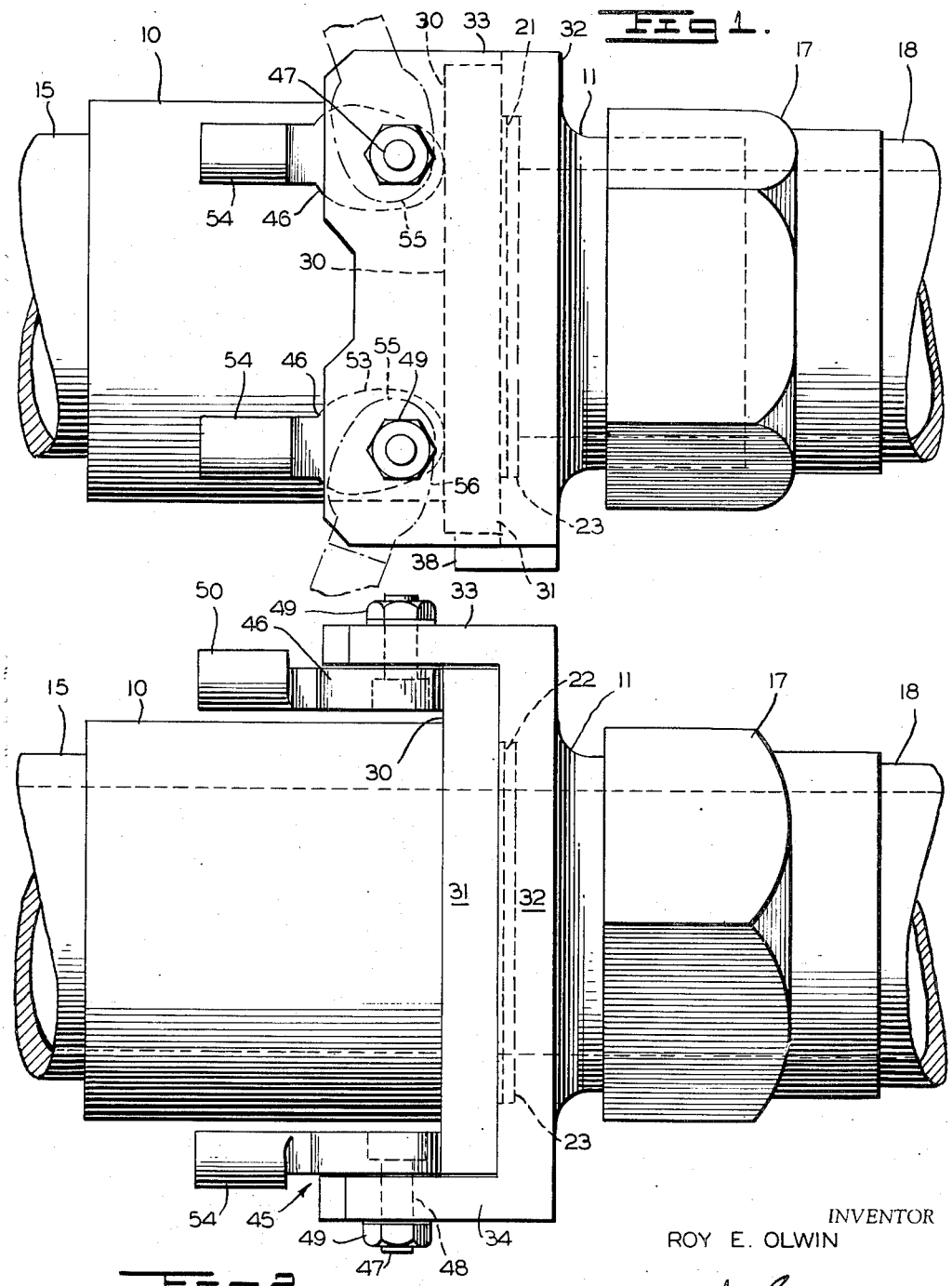

2,761,703

CAM OPERATED QUICK OPERATING HOSE COUPLING

Roy E. Olwin, Elgin, Ill.

Application March 12, 1953, Serial No. 341,930

4 Claims. (Cl. 285—326)

This invention relates to coupling devices and more particularly to a quick operating hose coupling.

In general, there are two types of coupling devices operable for connecting conduits, tubes or hoses in end to end relation, or for connecting conduits and the like to a source of fluid such as a pump or a well. Threaded coupling devices comprises one of these classes. Threaded coupling devices include a pair of coupling body members each provided with cooperating threads so that the body members may be threadedly joined together. With these devices, the coupling and decoupling operations are relatively slow requiring at least two workmen except in the case of operating coupling devices designed for use with conduits of relatively small diameter, where one operator may ordinarily adequately perform the operations. Also, considerable difficulty is involved when employing this type of coupling device in an environment where the device necessarily or may come in contact with dirt, grime or other debris causing the threads of the body members to become clogged and unthreadable or at least, more difficult to be brought into mutual threaded engagement. Also, the threads on the coupling body members may become damaged as in the case of all threaded members, such as upon improper alignment of the body members, and become inoperable.

The other class of coupling devices comprises clamped coupling devices. These coupling devices include clamping means for joining the body portions in coupled relation. One type of clamping means may comprise a plurality of nuts and bolts passing through and joining flange members which carry the conduits to be coupled. Clamped coupling devices employing this type of clamping means are subject to the disadvantages mentioned above in connection with threaded coupling devices. Clamped coupling devices which employ eccentric clamping means may be coupled and uncoupled within a relatively shorter period of time but fail to meet other requirements necessary for a commercially successful coupling device. The primary disadvantage inherent in eccentric clamping means which has rendered this type of coupling commercially impractical comprises the inability of the device to provide a positive seal between the coupling elements after repeated clamping and unclamping operations.

It is therefore an object of the present invention to provide a novel coupling device which overcomes the disadvantages outlined above.

Another object is to provide a quick operating hose coupling of novel design.

Another object is to provide a novel quick operating coupling device which may be easily coupled or uncoupled as compared to conventional coupling devices employed heretofore.

Still another object of the present invention is to provide a novel quick operating coupling device designed in such a manner as to be substantially free from operating difficulties and stoppages even when components of the device come in contact with dirt or other debris when in use.

Still another object is to provide a quick operating coupling device of the type provided with a sealing gasket, designed in such a manner so that the device may be coupled and uncoupled without rotation of coupling elements relative to the gasket.

A still further object of the present invention is to provide a novel quick operating coupling device of the type described above including self-aligning characteristics.

Other objects and features of the present invention will appear more fully below from the following detailed description considered in connection with the accompanying drawings which disclose a single embodiment of the invention. It is expressly understood, however, that the drawings are designed for purposes of illustration only and not as a definition of the limits of the invention. Reference for the latter purpose will be had to the appended claims.

In the drawings, in which similar reference characters denote similar elements throughout the several views:

Fig. 1 is a view in side elevation of a quick operating coupling device constructed in accordance with the principles of the present invention;

Fig. 2 is a view in top elevation of the quick operating coupling device shown in Fig. 1;

Fig. 3 is a view in side elevation, partially in section, of a quick operating coupling device shown in Fig. 1, and Fig. 4 is a view in section taken along the line 4—4 of Fig. 3.

It is contemplated by the present invention to provide a quick operating coupling device including a pair of coupling body members, each having a longitudinal bore substantially coincident with the opening of a connected conduit and a coupling surface adapted to cooperate with the coupling surface of the other body member in clamped relation to form a fluid and pressure tight connection between the conduits. The means provided by the present invention for moving the body members with their coupling surfaces in coupled relation comprises a clamping flange carried by one of the body members in non-rotatable relation with the other body member with means carried by the other body member for supporting a plurality of wedge clamping devices adapted to contact the clamping flange and move the body members toward each other with their coupling surfaces in clamped relation. The coupling surfaces of cooperating ends of the body members are respectively provided with a complementary circumferential groove and shoulder to provide self-alignment of the body members as well as for providing sealing gasket retaining space. The wedge clamping devices are operable with relative ease and are designed in such a manner as to insure a high degree of clamping pressure between the coupling surfaces even after repeated coupling and uncoupling operations.

With reference more particularly to the drawings, a quick operating hose coupling embodying the principles of the present invention is disclosed therein including a pair of body members 10 and 11. The body members 10 and 11 are each provided with a centrally disposed bore, 12 and 13 respectively, extending longitudinally therethrough in axial alignment when the cooperating or coupling ends of the body members are in clamped relation. The other ends are each adapted to be secured to the end of conduits which are desired to be coupled together. For example, the body member 10 may be provided with internal threads 14 which are adapted to threadably engage the threaded end of a conduit 15, while the body portion 11 may be provided with similar internal threads or with external threads 16 for threadably receiving a hexagonal nut 17 secured to a conduit 18.

The coupling end of the body member 10 is provided with a flat coupling surface 20 and the coupling end of the body member 11 is provided with a complementary flat coupling surface 21. The coupling surfaces 20 and 21 are each perpendicular to the longitudinal axis of their respective body member, and are adapted to lie in face to face relation when the body members are in coupled relation. The coupling surface 20 is provided with a raised annular portion 22 extending outwardly from the periphery of the bore 12 which is adapted to cooperate with and extend into an annular recess 23 provided in the coupling surface 21 of the body member 11. The annular portion 22 and the annular recess 23 are concentric with respect to each other and with respect to the longitudinal axis of their respective body members to provide the self-alignment feature of the coupling device as will be described more fully below. The annular recess 23 is provided with a dimension parallel to the longitudinal axis of the body member substantially greater than the corresponding dimension of the annular raised portion 22 to provide for an annular sealing gasket 24. The gasket is clamped between the parallel surfaces of the annular portion 22 and the recess 23 when the coupling surfaces 20 and 22 are in clamped relation to provide a fluid seal between the body members capable of withstanding relatively high pressures.

As mentioned above, it is an object of the present invention to provide wedge clamping means for forcing the body members into clamped position wherein the coupling surfaces 20 and 21 lie in tight face to face relation, with the wedge clamping means designed in such a manner as to be operable quickly to force the body members into clamped position and to allow the body members to be unclamped quickly from each other, as well as to provide a clamping arrangement which provides adequate clamping forces irrespective of the number of instances that the coupling device has been moved into and out of clamped position. The foregoing means includes a plurality of camming surfaces 30 extending around the periphery of the body member 10. The camming surfaces 30 are formed by a rectangular flange 31 formed integral with and extending outwardly from the periphery of the body member 10 adjacent its clamping end. The forward face of the rectangular flange 31, that is, the face of the flange adjacent the clamping end of the body member, comprises the coupling surface 20, while the rear face of the rectangular flange forms the camming surfaces 30 which, as shown more clearly in Fig. 4, comprise a continuous surface extending around the body member and lying in a common plane perpendicular to the longitudinal axis of the body member.

The foregoing means also includes a plurality of cam-like elements supported on the body member 11 for contacting the camming surfaces 30 with a wedging action to force the coupling surfaces 20 and 21 into tight contact and to provide a rigid assembly of the body members. The latter arrangement includes a rectangular flange 32, formed integral with the body member 11 and extending outwardly therefrom at its clamping end to form, at its forward face, the coupling surface 21. A pair of cam supporting members 33 and 34 extend from diametric sides of the rectangular flange 32 longitudinally of the body member 11 outwardly beyond the coupling surface 21 and terminate a substantial distance beyond the rear face of the rectangular flange 31 of the body member 10 when the body members are in clamped relationship as illustrated in the drawings. The cam supporting members 33 and 34 are parallel to each other and perpendicular to the coupling surface 21 and their internal surfaces 35 and 36, respectively, are parallel and spaced a distance slightly greater than the width of the flange 31 to allow the flange 31 to slide therebetween and occupy the relative position shown in the drawings. In the embodiment shown, the cam supporting members 33 and 34 extend from the side edges of the rectangular flange 32 so that the rectangular flange 31 may be inserted between the surfaces 35 and 36 from the upper end of the cam supporting members. A stop member 38 may be secured to the lower edge of the flange 32 by any suitable means such as flat-headed studs 39. The stop member extends outwardly from the coupling surface 21 and is properly positioned with respect to the longitudinal axis of the body member to support the flange 31 with the body member 10 in proper alignment.

Each of the cam supporting members supports a plurality of cam-like clamping devices 45 which are operable to contact the camming surfaces 30 with a wedging action and force the body members into clamped relation. Each of the clamping devices 45 includes a cam member 46 pivotally supported on one of the cam supporting members for swinging movement adjacent and perpendicular to inner surfaces 35 or 36. The pivot points of the cam members on the cam supporting member 33 and on the cam supporting member 34 lie on a straight line parallel to the coupling surface 20 and displaced from the coupling surface 21 a distance equal to the summation of the thickness of the flange 31 between the surfaces 20 and the camming surface 30 and an increment beyond the camming surface 30 sufficient to allow operation of the clamping devices. In the embodiment shown, a pair of cam members 46 are supported in spaced relation on each of the cam supporting members 33 and 34. For this purpose each cam member is provided with a pivot stud 47 formed integrally therewith or rigidly secured thereto such as by a press fit for integral movement. The pivot stud 47 is rotatably supported in a suitable opening 48 provided in the cam supporting member and a nut 49 is threadedly secured to the end of the stud 47 which protrudes beyond the outside wall of the cam supporting member. With this arrangement, the cam members 46 lie in a plane parallel to the internal surfaces 33 and 34, and rotate about axes perpendicular to the internal surfaces 33 and 34.

The cam members 46 are formed from a flat plate having parallel surfaces 50 and 51 and perpendicular side walls 52, with their axes of rotation being perpendicular to the surfaces 50 and 51. The cam members include an oval or substantially elliptical shaped portion 53 provided with a cylindrical operating handle 54 at one end in substantial alignment with its longitudinal axis. The opposite end of the portion 53, that is, the end of the portion on the side of the pivot axis opposite the operating handle 54, comprises a curved cam surface 55 which is adapted to contact the camming surfaces with a wedging action. The contour of the cam surface 55 has a gradually increasing radius in a direction opposite the direction of rotation of the cam member required for establishing the wedging action. The degree of this gradually increasing radius and the length of the surface of gradually increasing radius are selected to provide the necessary wedging force for all positions of contact with the camming surface throughout a substantially large arc of rotation of the cam member. The small radius end of the cam surface 55 merges into the portion 53 through a substantially straight section 56 spaced from the center of rotation a distance less than the smallest radii of the cam surface 55 to provide a space between the cam member and the camming surface, when the clamping devices are in unclamped position, slightly greater than the longitudinal dimension of the raised annular portion 22.

The cam surface 55, the straight section 56 and the operating handle 54 are so oriented with respect to each other that the camming devices are in an unclamped position when the longitudinal axis of the cam members approach a vertical position, and move into a clamped position with gradually increasing wedging action as the cam members are rotated to a position in which their operating handles are horizontal. In order to provide ease of operation and a compact coupling, the cam members at the upper side of the supporting members 34 and 35 are designed to require downward movement of the operating handle 54 for effecting clamping action, while the cam members at the lower side are designed to require upward movement. Thus, when the cam members are in a clamped position the operating handles do not protrude outwardly beyond the coupling members.

Operation of the coupling device provided by the present invention will be described as functioning to form a connection between the conduits 15 and 18. However, it is expressly understood that coupling devices embodying the principles of the present invention may be utilized to establish other types of connections, such as for connecting a conduit to the discharge side of a hydraulic pump, for example. The body members 10 and 11 are first secured to the ends of the conduits 15 and 18, respectively, by threading the body member 10 onto the threaded end of the conduit 15 and by threading the hexagonal nut 17 over the threaded end of the body portion 11. The body member 10 is then moved into coupling relation with the body member 11. This operation may be performed by inserting the rectangular flange 31 downwardly between the internal surfaces 35 and 36 of the cam supporting members and between the coupling surface 21 of the body member 11 and the cam devices 45 with the cam devices 45 in unclamped position as shown in broken line in Fig. 1. The body members are in a position to be coupled together when the lower edge of the flange 31 rests upon the stop member 38. The stop member 38 and the internal surfaces 34 and 35 of the cam supporting members 32 and 33 are properly positioned with respect to the bore 13 of the body member 11 and with respect to the outer edges of the rectangular flange 31 of the body member 10 to locate the bore 12 of the body member 10 in axial alignment with the bore 13. With the bores 12 and 13 in axial alignment the body member 10 may be moved toward the body member 11 with the annular raised portion 22 entering the annular recess 23. The clamping operation is accomplished by rotating the cam devices to bring their cam surfaces 55 into wedging relation with the camming surfaces 30. This operation may be accomplished by inserting the hollow end of the elongated member over the operating handle 54 and by rotating the cam members 46 about their pivots 47 to a position in which the longitudinal axis of the cam members lie substantially parallel to the longitudinal axis of the body members, as shown in Fig. 1. When the cam surfaces 55 are forced into wedging action with the camming surfaces 30, the body members are forced together with their respective coupling surfaces in tight face to face contact. When it is desired to uncouple the body members, the cam devices are rotated in the opposite direction to the position shown in broken lines in Fig. 1 of the drawings. In this position, the straight portions 56 of the cam members 46 lie adjacent the camming surfaces 30, thus allowing the body member 10 to be moved longitudinally away from the body member 11 a sufficient distance so that the outer edge of the annular raised portion 22 is outside of the annular recess 23. Thus, the body member 10 may be moved upwardly relative to the body member 11 beyond the upper ends of the supporting members 33 and 34 to completely uncouple the body members.

The clamping devices 45 are characterized in such a manner as to provide an arrangement for effecting a positive wedging action against the clamping surfaces 30 irrespective of the number of prior coupling and decoupling operations. This feature is accomplished by the provision of a cam element including a cam surface 55 of gradually increasing radius in a direction about the pivot axis opposite the direction of rotation of the device required for effecting the wedging action, and by providing a cam surface having such characteristics of appreciable length to maintain a wedging action throughout a substantial arc of rotation of the clamping device. With this design, upon initial contact between the cam surface and the clamping surface, the flange 31 will move a relatively large distance for each increment of rotation of the cam element as compared to the movement of the flange 31 responsively to incremental rotation of the cam element when it occupies a position with its longitudinal axis approximately horizontally disposed. This performance insures a positive wedging action, only releasable upon opposite rotation of the cam element, which is achieved irrespective of the number of previous coupling and uncoupling operations.

The use of a rectangular flange 31 to form the camming surfaces 30 and of the diametrically opposed cam supporting members 33 and 34 receiving the flange, allows utilization of the most efficient number of camming devices symmetrically distributed about the periphery of the body members. Since the body members 10 and 11 are necessarily in the same relative position for each coupling operation, the cam surfaces 55 of each of the clamping devices contact a similar spot on the camming surfaces 30. Thus, the clamping devices are "self seating" and, due to their design, as discussed above, provide the desired wedging action without adjustment even when the cam elements have become seated. The non-rotatable feature also prevents relative rotation of coupling elements with respect to the gasket 24, as well as providing means for aiding alignment of the body members.

The flanges 31 and 32 extending outwardly beyond the edges of the annular raised portion 21 and the annular recess portion 22 act as shields for these portions and substantially reduce damage to the coupling sealing surfaces.

While only one embodiment of the present invention has been disclosed and described herein, it is expressly understood that various changes and substitutions may be made therein without departing from the spirit of the invention as well understood by those skilled in the art. Reference therefore will be had to the appended claims for a definition of the limits of the invention.

I claim:

1. A quick operating coupling comprising a first body portion having a longitudinal opening and including a coupling face at one of its ends and connecting means at its other end, a second body portion having a longitudinal opening and including a coupling face at one of its ends and connecting means at its other end, the coupling faces of the body portions being adapted to cooperate with each other to connect the longitudinal openings of the body portions upon the body portions being moved into coupling relationship, flange means secured to the first body portion adjacent its one end on opposite sides of a plane passing through the longitudinal axis of the first body portion and extending radially outwardly from the first body portion and terminating in edge portions, the flange means including side surfaces located in a plane perpendicular to the longitudinal axis of the first body portion and facing the other end of the first body portion, supporting means secured to the second body portion adjacent its one end outside the coupling face of the second body portion on opposite sides of a plane passing through the longitudinal axis of the second body portion and extending outwardly from the one end of the second body portion away from the plane of the coupling face of the second body portion and terminating in end portions spaced from the plane of the coupling face of the second body portion a distance greater than the space between the plane of the coupling face of the first body portion and the plane of the side surfaces of the flange means, the supporting means including inside surfaces spaced from the longitudinal axis of the second body portion a distance greater than the space between the terminating edge portions of the flange means and the longitudinal axis of the first body portion so that the flange means may be inserted between the supporting means upon the body members being moved into coupling position, cam devices pivotally mounted on the end portions of the supporting means for rotation about axes perpendicular to the longitudinal axis of the second body portion, each of the cam devices including a cam surface parallel to its axis of rotation and of varying radius with respect to its axis of rotation, the cam devices being located adjacent the inside surface of the supporting means and in the space formed between the inside surface of the supporting means and the outside surface of the first body portion upon the body portions being moved into coupling position, means for rotating the cam devices to a non-camming position in which portions of the cam surfaces facing the one end of the second body portion are spaced from the plane of the coupling face of the second body portion a distance greater than the space between the plane of the side surfaces of the flange means and the plane of the coupling face of the first body portion to allow the body members to be moved into coupling position, said rotating means also adapted for rotating the cam devices to a camming position in which portions of the cam surfaces contact the side surfaces of the flange means to force the coupling faces of the body portions into coupling relationship, and means for maintaining the body portions in a predetermined angular relationship with their longitudinal axes coincident upon repeated movement of the body portions into coupling position so that portions of the cam surfaces contact the same area of the side surfaces upon repeated movement of the cam devices into camming position.

2. A quick operating coupling as defined in claim 1 in which the flange means comprises a circumferential flange including parallel edge portions equally disposed on opposite sides of the plane passing through the longitudinal axis of the first body portion, in which the supporting means comprises a supporting member secured to the second body portion adjacent its one end on both sides of the plane passing through the longitudinal axis of the second body portion and including parallel inside surfaces equally spaced from the plane, in which the parallel edge portions of the circumferential flange are spaced from each other a distance slightly less than the space between the parallel inside surfaces of the supporting members so that the parallel edge portions of the circumferential flange lie in contiguous relation with the parallel inside surfaces of the supporting members upon the body portions being moved into coupling position, and in which stop means are provided to limit relative transverse movement between the body portions in a direction parallel to the parallel edge portions of the circumferential flange and maintain the longitudinal axes of the body portions coincident upon the body portions being moved into coupled relationship.

3. A quick operating coupling as defined in claim 2 in which the supporting members comprise a first elongated supporting member secured to one side of the second body portion and a second elongated supporting member secured to the other side of the second body portion, and in which the supporting members have a dimension normal to the coupling face of the second body portion and of a length greater than the length of the parallel edge portions of the flange and the supporting members terminate in elongated marginal side portions pivotally supporting the cam devices.

4. A quick operating coupling as defined in claim 3 in which a pair of cam devices are rotatably supported adjacent the terminating elongated marginal side portions of each supporting member with a cam device being located adjacent each end of each elongated supporting member.

References Cited in the file of this patent

UNITED STATES PATENTS

| 44,794 | George | Oct. 25, 1864 |
| 228,196 | Hill | June 1, 1880 |
| 461,187 | Giesler | Oct. 13, 1891 |
| 936,886 | Hannold | Oct. 12, 1909 |